United States Patent Office 2,701,258
Patented Feb. 1, 1955

2,701,258

PREPARATION OF COLORLESS ALKYL ACID PHOSPHATES

James Howard Brown and Robert John Dearborn, Niagara Falls, and Irving Power, North Tonawanda, N. Y., assignors to Oldbury Electro-Chemical Company, Niagara Falls, N. Y., a corporation of New York No Drawing. Application December 8, 1952,
Serial No. 324,824

5 Claims. (Cl. 260—461)

This invention relates to a method for the preparation of alkyl acid phosphates by the condensation of an aliphatic alcohol with phosphorus pentoxide and is more particularly concerned with the preparation of light-colored or substantially colorless alkyl acid phosphates by such method.

In the usual method for preparing acid alkyl phosphates, an aliphatic alcohol is mixed with phosphorus pentoxide and the alkyl acid phosphate separated from unreacted materials. This procedure, while productive of good yields and simple to perform, usually results in a dark-colored ester. Even though a clear transparent substantially colorless ester is prepared, when standing on the shelf, or otherwise stored for a period of time on the order of two months or more, coloring or darkening occurs. While the darkening apparently has no adverse effect on the usual applications of such esters, it does detract from their "salability" and general appearance. A major use for alkyl acid phosphates is as components in enamels employing a urea-formaldehyde base. It will be readily noted that colorless esters for such use are to be desired.

It is, therefore, a principal object of the present invention to provide a procedure whereby light-colored or substantially colorless alkyl acid phosphates may be prepared. It is a further object of the present invention to provide a procedure for the condensation of aliphatic alcohols with phosphorus pentoxide in the presence of hypophosphorous acid or stable salts of hypophosphorous acid. Another object of the present invention is the provision of novel compositions of matter. Still a further object of the present invention is the provision of colorless alkyl acid phosphates containing at least five carbon atoms in the alkyl portions of the molecule. Another object of the present invention is to provide a procedure whereby alkyl acid phosphates having a long shelf life may be prepared. Other objects will become apparent hereinafter.

The foregoing and additional objects have been accomplished by condensing aliphatic alcohols with phosphorus pentoxide in the presence of hypophosphorous acid or stable hypophosphite salts. A preferred embodiment of the present invention contemplates the pre-mixing of the hypophosphorous acid or hypophosphite with an aliphatic alcohol and subsequent contact with phosphorus pentoxide. The reaction is usually conducted at a temperature between about zero and 100 degrees centigrade by mixing the reactants together with or without agitation and the subsequent separation of the alkyl acid phosphate from unreacted starting material. Atmospheric pressure is generally employed, however, other pressures may be employed, if desired. While the mole ratio of alcohol to phosphorus pentoxide is normally 3 to 1, other mole ratios may be employed to vary the end product. Generally speaking, the phosphorus pentoxide is gradually added to the alcohol, however, the reverse order of addition may be employed with caution. The reaction is exothermic in nature and cooling of the reactants or external heating may be necessary, depending on the particular alcohol used and the method of contacting the reactants.

Suitable additive agents in the process of the present invention include hypophosphorous acid, preferably containing less than 50 percent water, stable salts of hypophosphorous acid such as, for example, lithium hypophosphite, sodium hypophosphite, ammonium hypophosphite, potassium hypophosphite, calcium hypophosphite, strontium hypophosphite, barium hypophosphite, magnesium hypophosphite, cadmium hypophosphite, aluminum hypophosphite, et cetera. These salts may be employed as the hydrate thereof, or if desired, as the dehydrated material. The amount of hypophosphorous compound which is usually employed is between 0.5 and 3.0 percent of the alcohol employed. However, ratios between 0.1 percent and 10 percent are satisfactory. When hypophosphorous acid is the hypophosphite employed, a preferred embodiment of the present invention contemplates the use of an acid containing between about 10 and about 50 percent water.

As stated before, the preferred method is to mix the alcohol and hypophosphorous compound before contact with the phosphorus pentoxide. However, if a gradual addition of alcohol to the phosphorus pentoxide is employed, the gradual addition of a hypophosphorous compound to the reaction mixture will be found to be satisfactory.

Representative aliphatic monohydric alcohols which may be employed in the process of the present invention include, for example, methyl, ethyl, propyl, isopropyl, n-butyl, isobutyl, amyl, isoamyl, hexyl, isohexyl, heptyl, octyl, isooctyl, 2-ethyl-hexanol, methylisobutylcarbinol, diisobutylcarbinol, lauryl, stearyl, cetyl, myristyl, decyl, capryl, et cetera.

By following the procedure of the present invention, it is possible to prepare a substantially colorless alkyl acid phosphate. Since these materials are widely used in combination with urea formaldehyde resins in the preparation of enamels, it will be seen that it is desirable that such materials be colorless or substantially colorless. Esters prepared by the process of the present invention have a color of approximately 35 or less on the Hazen scale and are particularly useful in the preparation of enamels, as well as possessing a greater "salability" and longer shelf life.

When the methyl, ethyl, propyl and butyl alcohols are utilized in the procedure of the present invention, the esters prepared thereby are sometimes not colorless as separated from the reaction mixture. However, by the simple procedure of heating the ester at a temperature between about 60 and about 100 degrees centigrade, for a period of time between approximately two and twenty hours, preferably between five and seven hours, or until a yellow-red precipitate forms, the ester may be clarified. This precipitate may be removed by filtration, by oxidation with air or gaseous oxygen, or by the addition of small amounts of an oxidizing agent. The amount of oxidizing agent which will be required is that amount which will cause the precipitate to dissolve, in most cases, approximately one milliliter of 30 percent hydrogen peroxide per 2000 milliliters of alkyl acid phosphate, or its gaseous oxygen or air equivalent. When so-treated, these alkyl acid phosphates of the lower-aliphatic alcohols are substantially colorless, possessing a color on the Hazen scale of approximately 25, and did not develop color when stored up to two years.

The alcohols above butyl alcohol, when utilized in the procedure of the present invention, do not require this subsequent treatment, being colorless when separated from the reaction mixture and maintaining a colorless state over long periods of time exceeding three months. In fact, no increased color was developed when the esters were stored up to two years, the limit of the testing procedure.

The following examples are given to illustrate the method of the present invention, but are not to be construed as limiting:

*Example 1.—n-Propyl acid phosphate*

To a 4300 milliliter stainless steel beaker equipped with a stirrer and immersed in a water bath is added 2100 grams (2600 milliliters, 35 mols) of n-propyl alcohol and seven milliliters (8.4 grams, 0.2 percent by weight of the alcohol used) of 50 percent hypophosphorous acid. With efficient stirring and cooling, approximately 300 grams of phosphorus pentoxide is added gradually, so as to maintain the temperature below about 40 degrees centigrade. After the pentoxide has dissolved, and the temperature of the reaction mixture has returned to 20 degrees centigrade, an additional 3.5 milliliters of hypophosphorous acid is continued until a total of 1550 grams of phosphorus pentoxide and 21 milliliters of hypophosphorous acid (0.6 percent by weight of the alcohol) has been introduced, the temperature being maintained at 20 to 40 degrees centigrade throughout the addition. After stirring the reaction mixture for two to three hours, or until a practically clear reaction mixture is obtained, the product was decanted from a small residue of insoluble impurities and unreacted phosphorus pentoxide.

The decanted product was placed in a narrow-mouthed vessel and heated over a water bath at approximately 80 degrees centigrade for 48 hours, at which time the red precipitate had coagulated and begun to settle out. Six milliliters of 30 percent hydrogen peroxide was added and the precipitate disappeared. The ester mixture was clear and colorless, possessing a color on the Hazen scale of approximately 25.

When exactly the same procedure as above was duplicated without the presence of hypophosphorous acid, a dark, red-brown, nearly opaque liquid possessing approximately 200 times this amount of color, as shown by diluting a sample with alcohol, was obtained.

*Example 2.—Amyl acid phosphate*

To a 4300 milliliter stainless steel beaker immersed in a water bath was added 2350 grams (2900 milliliters, 26.6 mols) of the mixed isomers of amyl alcohol and 7.8 milliliters (9.4 grams, 0.2 percent by weight of the alcohol used) of 50 percent hypophosphorous acid. The alcohol-acid mixture was stirred and cooled during the gradual addition of 300 grams of phosphorus pentoxide. After the heat of reaction had subsided, and the pentoxide had dissolved, an additional 7.8 milliliters of hypophosphorous acid was added, followed by 300 grams of phosphorus pentoxide. The alternate addition of phosphorus pentoxide and hypophosphorous acid was continued until a total of 1200 grams (8.45 mols) of phosphorus pentoxide and 39 milliliters (1 percent by weight of the alcohol used) of 50 percent hypophosphorous acid had been introduced. The temperature was maintained at 20–40 degrees centigrade during the addition, the addition requiring three hours. The reaction mixture was stirred an additional three hours, until it was clear, and filtered from the small insoluble residue. The ester is practically water-white, with a Hazen color of approximately 35.

When the procedure described in Example 2 was repeated without the presence of hypophosphorous acid, the product was a dark brown.

*Example 3.—Isobutylethyl acid phosphate*

To a 4300 milliliter stainless steel beaker was added 2500 grams (24.5 mols, 3075 milliliters) of methylisobutyl carbinol and 4.1 milliliters (5 grams, 0.1 percent by weight of the alcohol used) of 50 percent hypophosphorous acid. The mixture was stirred and 1065 grams (7.5 mols) of phosphorus pentoxide gradually added over a period of two hours, the temperature being maintained below 50 degrees centigrade by external cooling. After the phosphorus pentoxide had been added, the reaction mixture was stirred for an additional two hours, allowed to settle, and the clear colorless product decanted from the residue of unreacted phosphorus pentoxide. The product is nearly colorless, the Hazen scale color being 25.

When the procedure of Example 3 was repeated in the absence of hypophosphorous acid, a light colored ester was separated from the reaction mixture which developed a distinct orange-red color after a few days. The product of Example 3 did not develop color on standing for over three months.

*Example 4.—Stearyl acid phosphate*

To a stainless steel reactor equipped with a stirrer and a coil was added 100 pounds of octadecyl alcohol and 100 grams of 90 percent hypophosphorous acid. The alcohol was melted and after the mixture had become homogeneous, four pounds of phosphorus pentoxide was added, the temperature being maintained at 70 to 90 degrees centigrade throughout the addition. The reaction mixture was stirred until all the pentoxide had dissolved and successive portions of phosphorus pentoxide and hypophosphorous acid added until 19 pounds of the phosphorus pentoxide and 372 milliliters (one pound) of 50 percent hypophosphorous acid had been introduced. This required a period of approximately one hour. The ester was stirred for an additional two hours with the addition of heat, when necessary, to keep the temperature between 70 and 90 degrees centigrade. The product was filtered through a fine mesh screen, poured into stainless steel trays and allowed to solidify. The product is a white paraffin-wax-like material, having a pale yellow color.

When the procedure of Example 4 was duplicated without the presence of hypophosphorous acid, a chocolate-brown material was prepared.

*Example 5*

To a two-quart stainless steel beaker was added 600 grams of commercial grade n-propyl alcohol and two grams of pure, crystalline sodium hypophosphite monohydrate, $NaH_2PO_2:H_2O$. The alcohol-salt mixture was stirred and cooled during the addition of 80 grams of phosphorus pentoxide. An additional one gram of sodium hypophosphite was added, followed by a further quantity of phosphorus pentoxide. This procedure was continued until 6.8 grams of the sodium hypophosphite and phosphorus pentoxide in the amount of 472 grams was added to the mixture. Decantation of the ester from the unreacted phosphorus pentoxide and undissolved sodium hypophosphite yielded an ester having a faint yellow color and slight turbidity which cleared on long standing. After six weeks, no color developed.

The product made by similar procedure of Example 5, omitting the sodium hypophosphite, is dark-brown, and the color intensity increases considerably on standing for six weeks.

*Example 6*

The procedure described in the preceding example, Example 5, was repeated except for the addition of 13.7 grams of calcium hypophosphite, $Ca(H_2PO_2)_2$, instead of the sodium hypophosphite. The ester which was separated was initially slightly yellow and clear. This color did not change perceptibly on standing for six weeks.

*Example 7*

The procedure of Example 5 was repeated using 15.6 grams of potassium hypophosphite, $KH_2PO_2$, instead of the sodium hypophosphite. The ester which was separated was not significantly different from the ester separated by the procedures of Examples 5 and 6.

Various modifications may be made in the method of the present invention without departing from the scope thereof, and it is to be understood that we limit ourselves only as defined in the appended claims.

We claim:

1. A process for the preparation of alkyl acid phosphates which comprises: mixing, at a temperature between zero and 100 degrees centigrade, and in the presence of between 0.1 and ten percent, based on the amount of alcohol employed, of a compound selected from the group consisting of hypophosphorous acid and stable salts of hypophosphorous acid, an aliphatic alcohol and phosphorus pentoxide, and separating a colorless, non-darkening alkyl acid phosphate from the reaction mixture.

2. A method for the preparation of alkyl acid phosphates which comprises: mixing an aliphatic alcohol containing up to 4 carbon atoms with between 0.5 and 3.0 percent, based on the alcohol employed of a compound selected from the group consisting of hypophosphorous acid and stable soluble hypophosphite salts, thereafter adding this mixture to phosphorus pentoxide at a temperature between 20 and 100 degrees centigrade, heating the reaction mixture at a temperature between about 60 and 100 degrees centigrade for at least two hours, and treating the reaction product so-formed with hydrogen peroxide to remove any precipitate.

3. A process for preparing stable, colorless alkyl acid phosphates which comprises: mixing an aliphatic alcohol containing at least five carbon atoms with between 0.5 and 3.0 percent, based on the alcohol employed, of a compound selected from the group consisting of hypophosphorous acid and stable soluble hypophosphite salts, thereafter adding the mixture to phosphorous pentoxide at a temperature between about zero and 100 degrees centigrade, and separating a stable, substantially colorless, alkyl acid phosphate from the reaction mixture.

4. A process for preparing stable, colorless alkyl acid phosphates which comprises: mixing an aliphatic alcohol containing up to and including four carbon atoms with between 0.5 and 3.0 percent, based on the alcohol employed, of a compound selected from the group consisting of hypophosphorous acid and stable soluble hypophosphite salts, thereafter adding the mixture to phosphorus pentoxide at a temperature between about zero and 100 degrees centigrade, separating the reaction product, heating said reaction product at a temperature between 60 and 100 degrees centigrade, and removing the resulting precipitate.

5. A process for preparing stable, colorless alkyl acid phosphates which comprises: mixing an aliphatic alcohol containing up to and including four carbon atoms with between 0.5 and 3.0 percent, based on the alcohol employed, of a compound selected from the group consisting of hypophosphorous acid and stable soluble hypophosphite salts, thereafter adding the mixture to phosphorus pentoxide at a temperature between about zero and 100 degrees centigrade, separating the reaction product and heating said reaction product at a temperature between 60 and 100 degrees centigrade, and removing the resulting precipitate, by contacting said precipitate with hydrogen peroxide.

References Cited in the file of this patent

UNITED STATES PATENTS 2,193,965   Hochwalt _____ Mar. 19, 1940